United States Patent [19]

Lay

[11] Patent Number: 4,504,196
[45] Date of Patent: Mar. 12, 1985

[54] ROTARY TURBOENGINE AND SUPERCHARGER

[76] Inventor: Joachim E. Lay, 5371 Wild Oak Dr., East Lansing, Mich. 48823

[21] Appl. No.: 451,496

[22] Filed: Dec. 20, 1982

[51] Int. Cl.³ .................... F04B 17/00; F04B 35/00
[52] U.S. Cl. ................................. 417/355; 417/408
[58] Field of Search ............... 417/405, 406, 407, 408, 417/409, 355, 77, 79

[56] References Cited

U.S. PATENT DOCUMENTS

| 960,339 | 6/1910 | Goetz | 417/406 |
| 4,072,445 | 2/1978 | Hay | 417/405 |

FOREIGN PATENT DOCUMENTS

| 2655732 | 6/1977 | Fed. Rep. of Germany | 417/406 |
| 111185 | 8/1925 | Switzerland | 417/406 |

Primary Examiner—Carlton R. Croyle
Assistant Examiner—Timothy S. Thorpe
Attorney, Agent, or Firm—Ian C. McLeod

[57] ABSTRACT

A fluid driven turbine having a stator member and a turbine member rotatable on an axis and supporting turbine blades and with a fluid compression section is described. The fluid compression section is provided along the axis of rotation of and inside the turbine member by providing: (1) a tubular extension (13 or 102) of the stator member and (2) a rotor means (30 or 104) and at least one rotor blade means (50, 51, 52) moveable perpendicular to the axis on the turbine member which fits inside the tubular member to provide at least two adjacent first and second chambers which are defined by an inside wall of the tubular extension and the rotor means and blade means. The tubular member has a line of minimum eccentricity (12) parallel to the axis with inlet and outlet openings (15, 16) on either side of the line of minimum eccentricity to and from the chambers so that fluid is drawn into the chamber and compressed and then exits from the chambers. The turbine-compressor is useful for instance as a turbocharger, as a drive means for other apparatus and as a refrigeration compressor.

8 Claims, 17 Drawing Figures

ROTARY TURBOENGINE AND SUPERCHARGER

BACKGROUND OF THE INVENTION

1. Field of the Invention

The present invention relates to a fluid driven turbine having a compressor section on the axis of and inside the turbine member formed by extensions of the stator member and the turbine member. In particular the present invention relates to a turbocharger or a turboengine as preferred embodiments.

2. Prior Art

Various combinations of turbines and compressors mounted on a single shaft are known. The conventional automotive turbocharger is an example where the turbine is provided on one end of a shaft and the compressor driven by the turbine is provided on the other end of the shaft. In these devices the fluid flow is at right angles through the compressor or turbocharger sections resulting in some loss of energy. There are numerous other examples of compressors which are added onto the end of an output shaft from the turbine. The space inside the turbine is not utilized for any compressor usually because it is needed to provide support for the turbine around the axis of rotation.

OBJECTS

It is therefore an object of the present invention to provide a turbine and compressor combination which utilizes the space inside the rotor member. It is further an object of the present invention to provide a turbine and compressor combination which allows a direct line of flow of the turbine driving fluid. Further it is an object of the present invention to provide a compressor turbine combination which is relatively inexpensive to manufacture and assemble. These and other objects will become increasingly apparent by reference to the following description and the drawings.

The present invention relates to an improvement in a turbine having a stator member and a turbine member rotatable on an axis inside the stator member with turbine blades mounted around the outside of the turbine member, wherein the turbine has a fluid inlet through the stator member to the blades and a fluid outlet from the blades which comprises:

providing a fluid compressor section inside the turbine as part of the stator member and the turbine member including:

(a) a rotor means (30, 104) on the axis as part of the turbine member with at least one rotor blade means (50, 51) which moves in the rotor means in a slot perpendicular to the axis; and (b) a tubular extension (13, 102) of the stator means having an inside surface (13a, 102a) around the rotor means forming a first chamber having a line of minimum eccentricity across the surface parallel to the axis and an outside surface such that the rotor blade means engages the surface to define adjacent first and second chambers, wherein inlet and outlet openings (15, 16) leading outside of the turbine are provided through the inside and outside surfaces of the extension on either side of the line of minimum eccentricity to provide fluid to and from as the rotor means are rotated from the first and second chambers;

wherein in operation of the turbine the rotor means and rotor blade means are rotated together in the extension to compress and drive the fluid between the opening on the inside of the extension to the first and second chamber and from the chambers to the opening on the other side of the extension as a compressed fluid.

SPECIFIC DESCRIPTION

Figure 1:
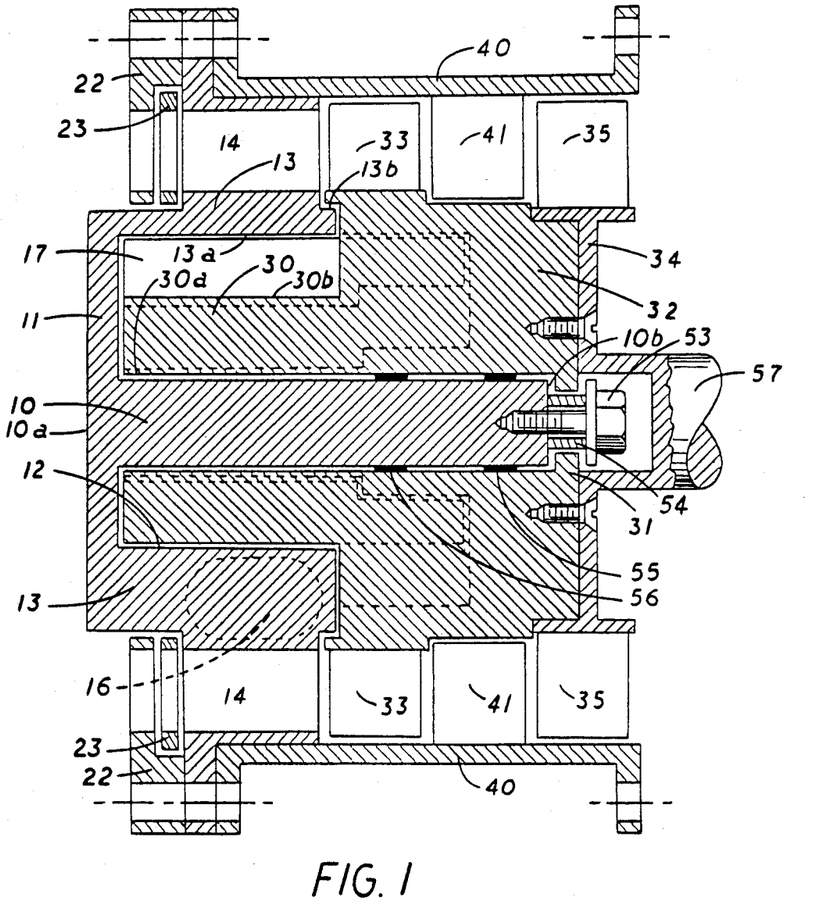
FIG. 1 is a front cross-sectional view of a preferred turboengine of the present invention showing the stator member (10, 11, 13) and turbine member (30, 31, 32) together forming a rotary compressor wherein two sets of turbine blades (50, 51) as shown in FIG. 6 are provided along with flow vanes (41) on the housing (40) between the sets and with a shaft (57) extending from the turbine as a drive means.
Figure 2:
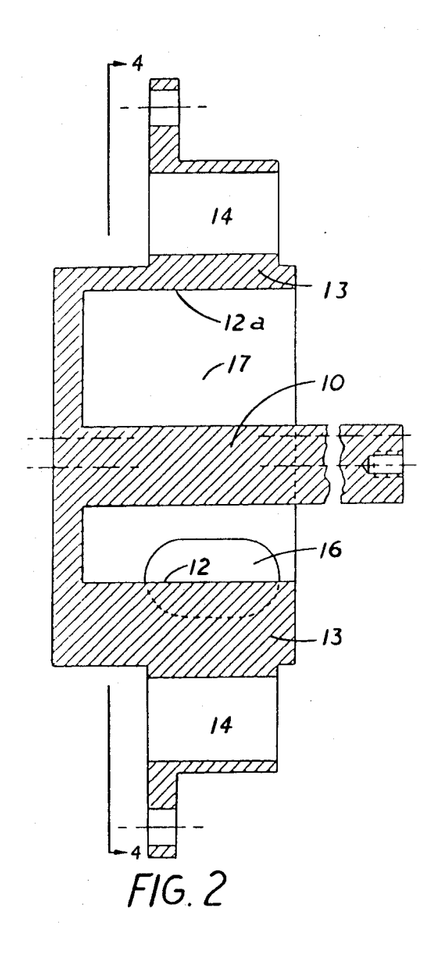
FIG. 2 is a side cross-sectional view of the stator member shown in FIG. 1 of the engine, showing a shaft and a tubular extension around the shaft.
Figure 3:
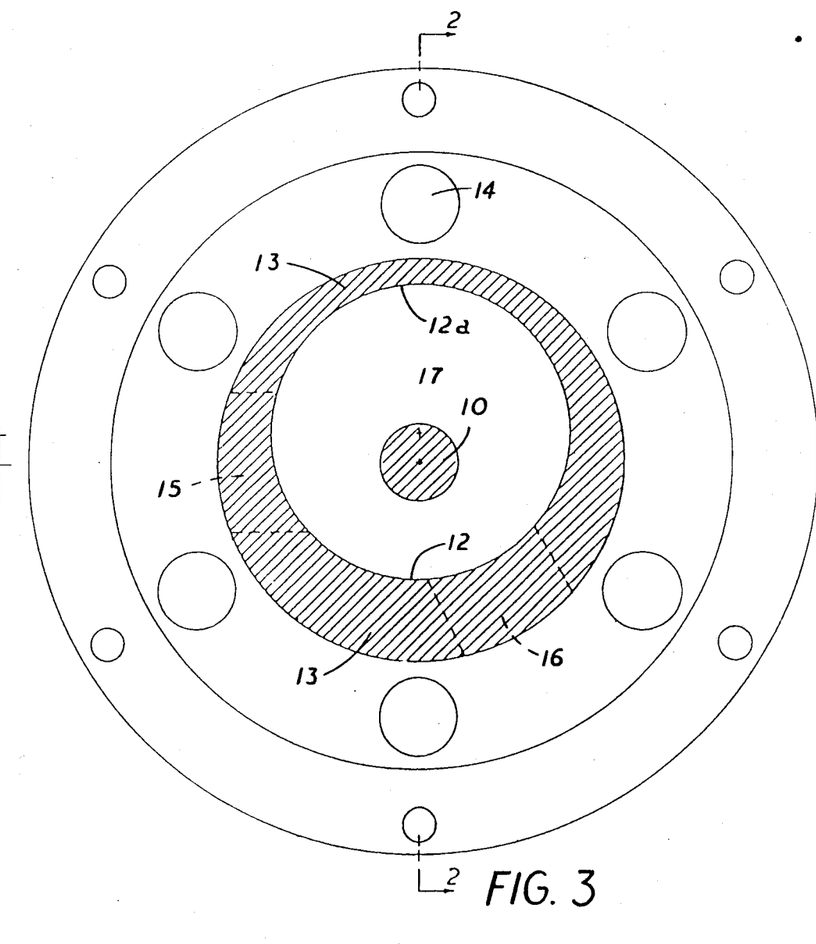
FIG. 3 is a front partial cross-sectional view along line 4—4 of FIG. 2.
Figure 4:
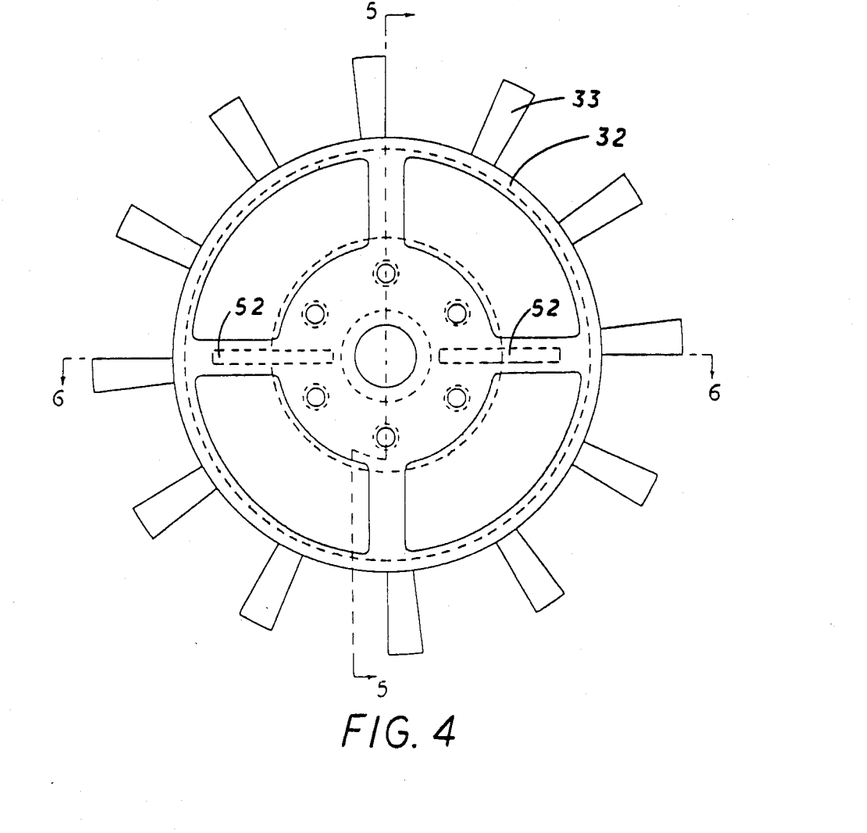
FIG. 4 is a front view of turbine member (32) of the present invention showing the positioning of the turbine (33) blades.
Figures 5, 5A:
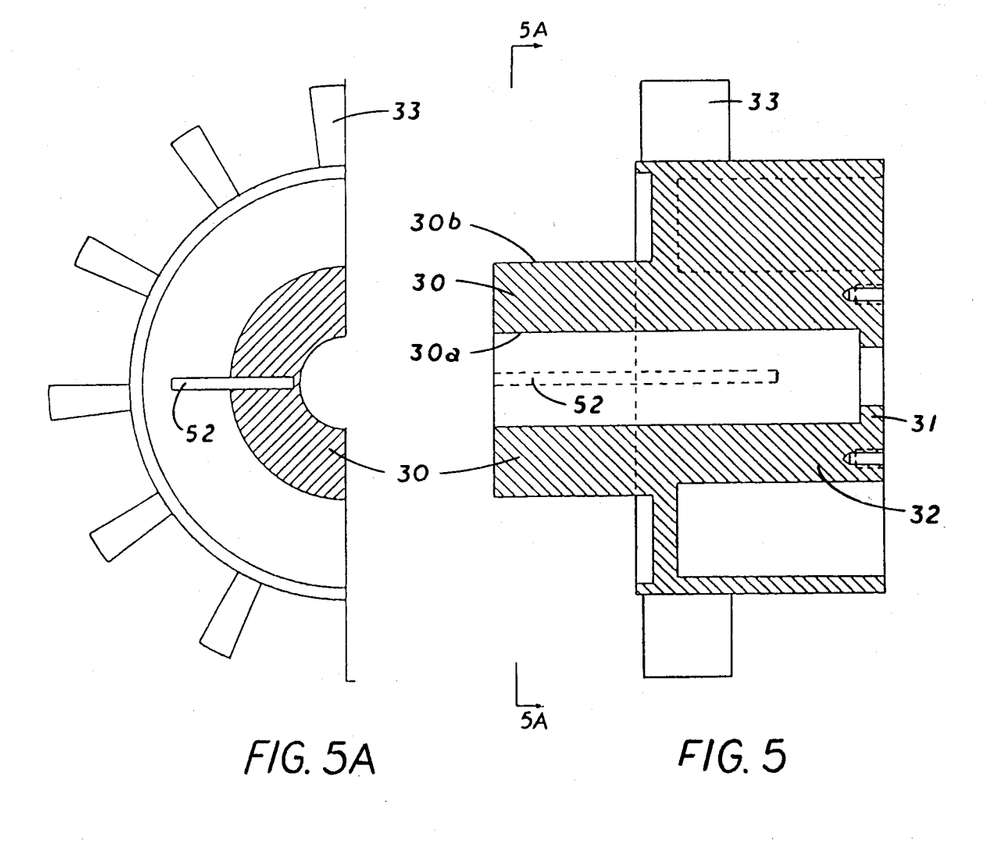
FIG. 5 is a side cross-sectional view along line 5—5 of FIG. 4 illustrating the construction of the rotor means (30).
FIG. 5A is a front sectional view along line 5A—5A of FIG. 5.
Figure 6:
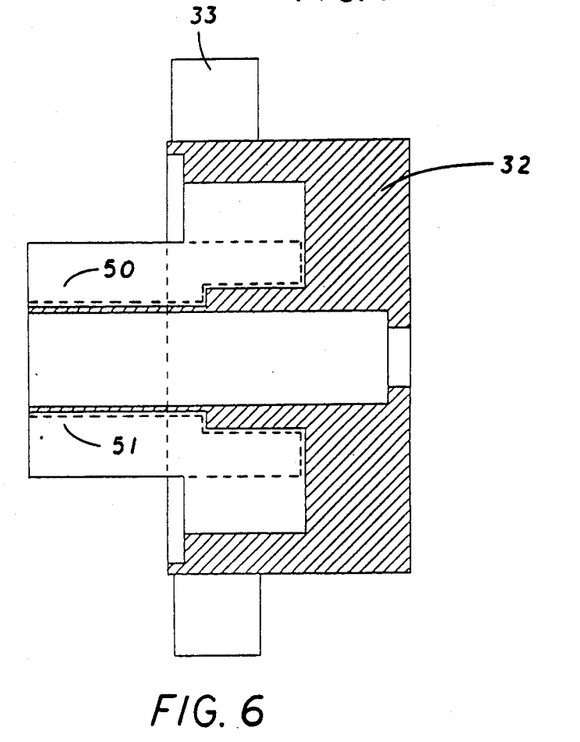
FIG. 6 is a side cross-sectional view along line 6—6 of FIG. 4 particularly showing the positioning of the rotor blades (50, 51) on the rotor means (30).
Figure 6A:
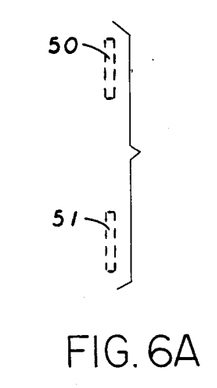
FIG. 6A is a front sectional view of the blades 50 and 51 shown in broken lines in FIG. 6.
Figure 7:
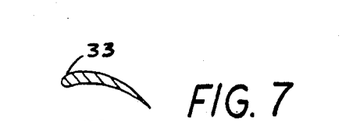
FIG. 7 is a cross-sectional view of a turbine blade.
Figure 8:
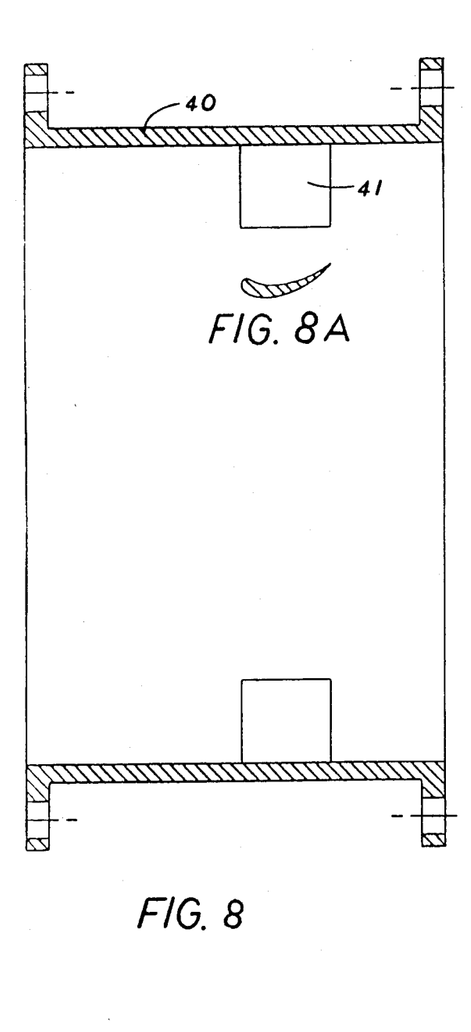
FIG. 8 is a side cross-sectional view of the stator housing (40) along line 8—8 of FIG. 9.
Figure 9:
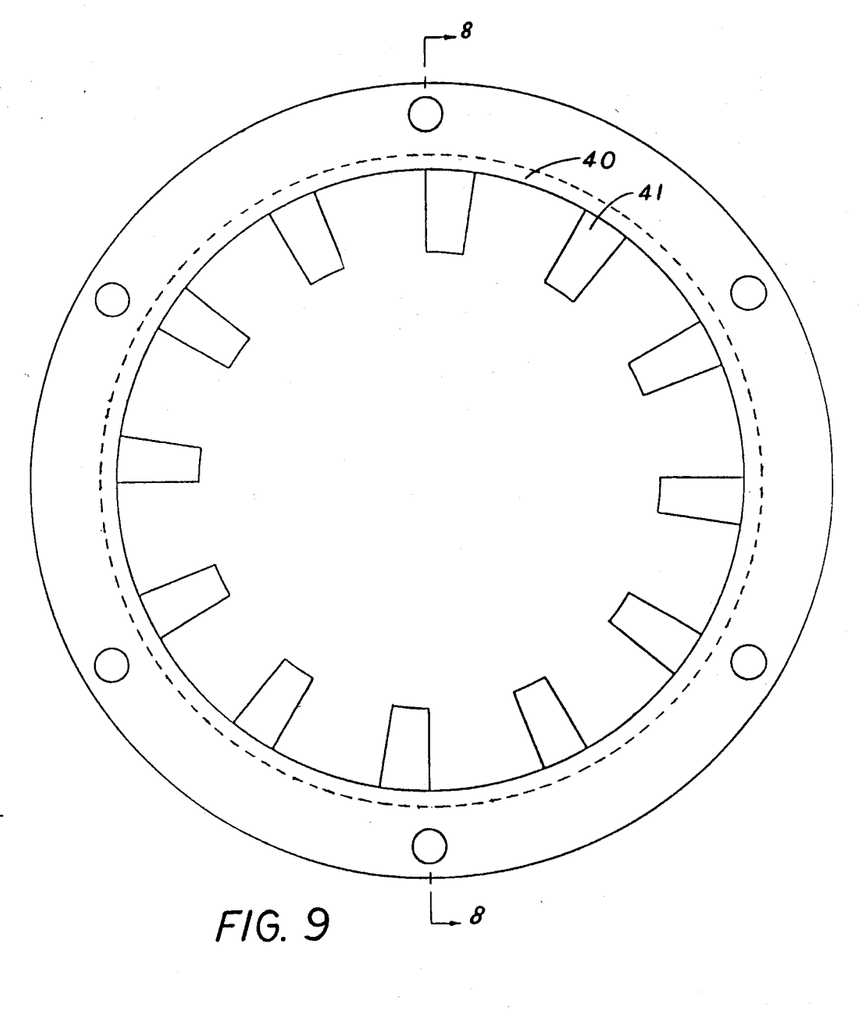
FIG. 9 is a front view of the stator housing (40).
Figures 10, 11:
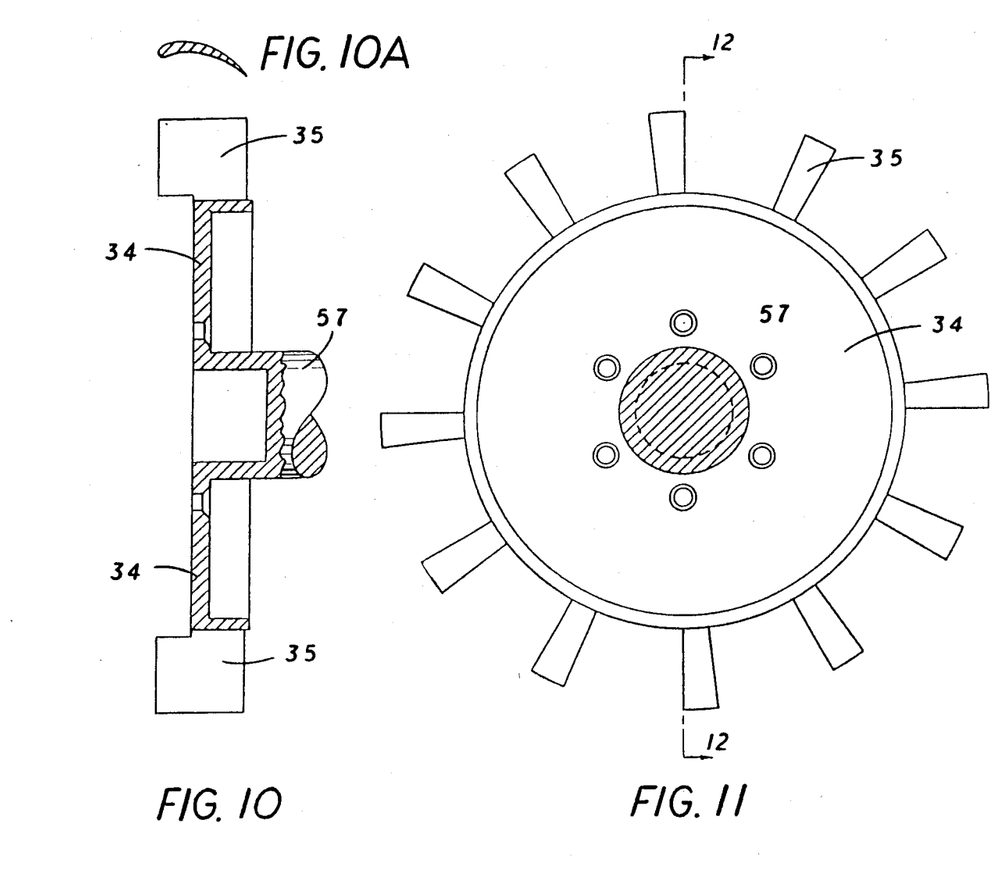
FIG. 10 is a side partial cross-sectional view of a second turbine member (34), which is in spaced relation to the first turbine member (32).
FIG. 11 is a front partial cross-sectional view of FIG. 10 showing the positioning of the turbine blades (35) on the second turbine member (34).

FIG. 1 shows the assembly of the stator member and turbine member in forming the turbine and compressor sections of the apparatus of the present invention. In particular, a cylindrically cross-sectioned shaft 10 having a longitudinal axis along the length between two opposing ends 10a and 10b is provided. A first plate 11 is mounted on and around the shaft 10 at one end 10b perpendicular to the axis. The plate 11 is provided with an integral first cylindrical tubular extension 13 around the shaft 10 having a cylindrical inside surface 13a which is eccentric to the axis and a cylindrical outside surface 13b which is concentric with the axis. The inside surface 13a has a radial line 12 of minimum eccentricity parallel to the axis. There is also a corresponding line 12a of maximum eccentricity parallel to the axis opposite the line of minimum eccentricity 12. The plate 11 is provided with multiple equidistant tubular openings 14 positioned radially of and concentric with the axis of the shaft 10 and around the outside of the extension 13. As shown in FIG. 3, the extension 13 is provided with two chambers 15 and 16 on either side of the line of minimum eccentricity which communicate with a space 17 defined between the shaft 10 and extension 13. Inlet and outlet openings are provided to and from chambers 15 and 16 and space 17.

The tubular openings 14 are preferably at an angle to the axis of the shaft 10 such to direct fluid flow at an angle. A retaining ring 22 and throttle plate 23 is provided around the openings 14. The throttle plate 23 is a ring with six holes which can slide over openings 14 to reduce the input of fluid to blades 33, 35 and 41.

The turbine member includes a rotor 30 having a cylindrical inside surface 30a rotatably mounted on the shaft 10 and having a cylindrical outside surface 30b concentric with the axis and in closely spaced relation to the line 12 of minimum eccentricity of the inside surface of the first tubular extension 13. The rotor 30 supports an integral second plate 34 which is perpendicular to the axis. The cylindrical extension 32 has a cylindrical surface which overlaps a portion of the outside surface 13b of the extension 13. The extension 32 is provided with a set of radially oriented turbine blades 33 mounted on and around the extension 32 in line with the tubular openings 14. The plate 34 is mounted on the extension 32 and provided with an integral second set of radially oriented turbine blades 35 which are adjacent to and in spaced relation to the set of blades 33.

A housing 40 is mounted around the openings 14 in the plate 11 and the first turbine blades 33 and second turbine blades 35. The turbine blades 33 and 35 are in closely spaced relationship with the housing 40. The housing 40 is provided with multiple radially oriented integral angled flow directing vanes 41 between the sets of turbine blades 33 and 35.

Two rotor blades 50 and 51 are mounted in slots 52 of rotor 30 so as to provide two sealed chambers in the space 17 inside of the extension 13 and rotor 30. A threaded bolt 53 is provided as a means for retaining rotor plate 34 and shaft 10 so that the rotor 30 and its extension 32 is rotatably mounted on the shaft 10. A washer 54 is provided upon which the assembly 30, 32, 34 can rotate and bears on projection 31 from extension 32. Bearings 55 and 56 are provided between the extension 32 and the shaft 10 to provide ease of rotation of the turbine assembly. Generally conduit means (not shown) away from the housing 40 are provided for inlet and outlet of fluid through openings 15 and 16. Generally the plate 34 has a shaft 57 which extends from it to provide a drive means.

Figure 12:
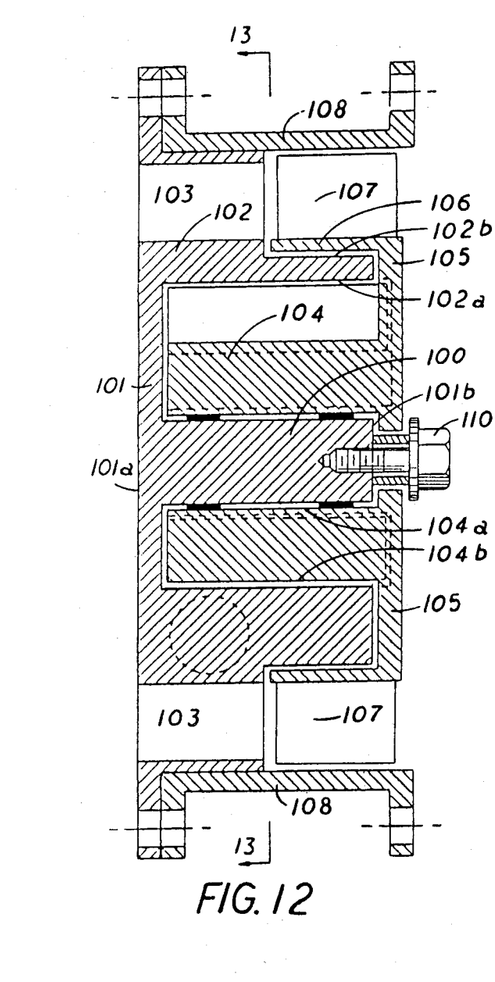
FIG. 12 is a side cross-sectional view of a preferred turbocharger of the present invention particularly showing the stator member (100, 101, 102) and the turbine member (105, 107) together forming a rotary compressor (102, 104) between them.
Figure 13:
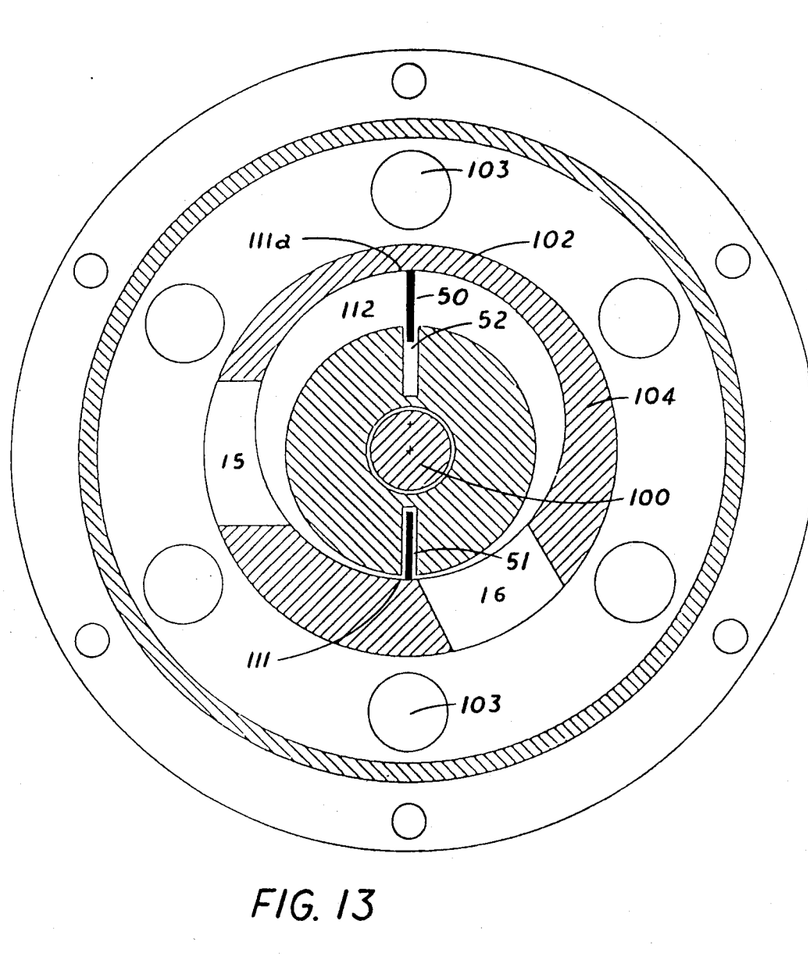
FIG. 13 is a front cross-sectional view along line 13—13 of FIG. 12.

FIGS. 12 and 13 show a simplified version of the turboengine of FIGS. 1 to 11 which is particularly useful as a turbocharger for automotive uses. It is essentially similar to the turboengines shown in FIGS. 1 to 11. A circular cross-sectioned cylindrical shaft 100 defining a longitudinal axis along the length between two opposing ends 101a and 101b is provided. A plate 101 is affixed on and around the shaft 100 at one end perpendicular to the axis. An integral tubular extension 102 is provided around the shaft 100 and has a cylindrical inside surface 102a which is eccentric to the axis and a cylindrical outside surface 102b which is concentric with the axis. The inside surface 102a has a radial line 111 of minimum eccentricity parallel to the axis and a corresponding opposing line 111a of maximum eccentricity parallel to the axis. Multiple tubular openings 103 are positioned equi-radially of the axis of the shaft. Inlet and outlet openings to space 112 are provided on either side of the line 111 of minimum eccentricity.

In the turbine assembly, a rotor 104 having a cylindrical inside surface 104a is rotatably mounted on the shaft 100. The rotor 104 has a cylindrical outside surface 104b concentric with the axis in a closely spaced relation to the line 111 of minimum eccentricity of the inside surface 102a of the tubular extension 102. The rotor 104 supports an integral plate 105 which is perpendicular to the axis and parallel to the plate 101. The plate 105 is provided with a cylindrical extension 106 which overlaps the extension 102 such that the outside surface of the extension 106 is concentric to the axis of the shaft 100. The extension 106 is provided with a set of radially oriented turbine blades 107 adjacent to and in line with the tubular openings 103. A housing 108 is mounted on the first extension 102 around the openings 103 in the plate 101 such that the turbine blades 107 are in closely spaced relationship with the housing 108.

At least one rotor blade 50, 51 is mounted in slots 52 of the rotor 104 so as to provide at least one sealed chamber 112 with the inside of the extension 102, the plates 101 and 105 and the outside surface of rotor 104.

In the operation of the turboengine of FIGS. 1 to 11 the turbine driving fluid is provided through the tubular openings 14 across the first blades 33 against the flow vanes 41 to the second blades 35 and out of the housing 40 to thereby rotate the extension 32, the plate 34 and the rotor 30 together. The rotor 30 and rotor blades 50 and 51 compress and drive the fluid between the inlet and outlet openings 15 and 16 through chamber 17 in the extension 13. As can be seen the turboengine provides a very compact construction for the turbine and compressor functions.

The operation of the turbocharger of FIGS. 12 and 13, provides the same type of compression of the fluid. The rotor 104 and the blades 50 and 51 rotate inside the extension 102 between the plates 101 and 105 to compress the fluid. The fluid flow for the turbine section is through the opening 103 against blades 107 to drive the rotor 104 and plate 105 assembly. The inlet openings 103 are preferably angled with respect to the turbine blades 107. The fluid is compressed and driven in the compressor section by the movement of the turbine assembly.

It will be appreciated that there are various types of turbines that could be used in the present invention and that the compressor section is the essential feature of the present invention in its positioning internally of the turbine. Numerous variations will occur to those skilled in the art.

I claim:

1. In a turbine having a stator member and a turbine member rotatable on an axis inside the stator member with turbine blades mounted around the outside of the turbine member, wherein the turbine has a fluid inlet through the stator member to the blades and a fluid outlet from the blades and wherein the inlet and outlet are parallel to the axis of rotation of the turbine member and are on either side of the blades so that fluid flow in the outlets rotates the turbine member the improvement which comprises:

providing a fluid compressor section inside the turbine as parts of the stator member and the turbine member including:

(a) a rotor means (30, 104) on the axis as part of the turbine member with at least one rotor blade means (50, 51) which moves in the rotor means in a slot perpendicular to the axis; and (b) a tubular extension (13, 102) of the stator member having an inside surface (13a, 102a) around the rotor means forming a first chamber having a line of minimum eccentricity across the surface parallel to the axis and an outside surface such that the rotor blade means engages the surface to define adjacent first and second chambers, wherein inlet and outlet openings (15, 16) leading outside of the turbine are provided through the inside and outside surfaces of the extension on either side of the line of minimum eccentricity to provide fluid to and from as the rotor means is rotated from the first and second chambers;

wherein in operation of the turbine the rotor means and rotor blade means are rotated together in the extension to compress and drive the fluid between the opening on one side of the extension to the first and second chamber and from the chambers to the opening on the other side of the extension as a compressed fluid.

2. A turbine which comprises in combination:

(a) a shaft (10) defining a longitudinal axis along a length between two opposing ends;

(b) a first plate (11, 101) mounted on and around the shaft at one end perpendicular to the axis with an integral first tubular extension (13, 102) around the shaft having an inside surface (13a, 102a) which is eccentric to the axis and an outside surface and with a radial line of minimum eccentricity of the inside surface parallel to the axis and the plate having multiple equidistant tubular openings (14, 103) positioned radially and concentric with the axis and around the outside of the extension and with adjacent inlet and outlet openings (15, 16) between inside and outside surfaces of the first tubular extension on either side of the line of minimum eccentricity;

(c) a rotor means (30, 104) having an inside surface rotatably mounted on the shaft to provide rotation around the axis of the shaft and having an outside portion in spaced relation to the inside surface of the first tubular extension, wherein the rotor means supports a second plate (34, 105) which is perpendicular to the axis and parallel to the first plate, with a second extension (32) connected to the second plate and with a set of radially oriented turbine blades (33, 107) mounted on the second extension in line with the tubular openings so that fluid flow is parallel to the axis of the shaft in the tubular openings across the turbine blades to rotate the rotor;

(d) a housing (40, 108) mounted around the openings in the first plate and turbine blades around the axis of the shaft such that the turbine blades are in closely spaced relationship with the housing;

(e) at least one rotor blade (50, 51) mounted in a slot around the outside surface of the rotor so as to provide at least two adjacent sealed chambers with the inside of the first extension, the first and second plates and the outside surface of the rotor;

(f) connection means (53, 100) for rotatably joining the second plate to the end of the shaft; and wherein in operation of the turbine a driving fluid flow is provided through the tubular openings across the turbine blades and out of the housing to thereby rotate the second plate and the rotor means and wherein the rotor blade and rotor means together compress and drive the fluid between the inlet and outlet openings inside the rotor means on either side of the line of minimum eccentricity.

3. A turbine which comprises in combination:

(a) a cylindrically cross-sectioned shaft (100) defining a longitudinal axis along a length between two opposing ends (101a, 101b);

(b) a first plate (101) mounted on and around the shaft at one end perpendicular to the axis with an integral cylindrical tubular first extension (102) around the shaft having a cylindrical inside surface (102a) which is eccentric to the axis and a cylindrical outside surface (102b) concentric with the axis and with a radial line of minimum eccentricity parallel to the axis and the plate having multiple equidistant tubular openings (103) positioned radially of and concentric with the axis and around the outside of the extension and with adjacent inlet and outlet openings (15 and 16) through the inside and outside surfaces of the first extension on either side of the line of minimum eccentricity;

(c) a rotor (104) having a cylindrical inside surface (104a) rotatably mounted on the shaft to provide rotation around the axis of the shaft and having a cylindrical outside surface (104b) concentric with the axis and in closely spaced relation to the line of minimum eccentricity of the inside surface of the first extension, wherein the motor supports an integral second plate (105) which is perpendicular to the axis and parallel to the first plate, with an integral cylindrical second extension (106) from the second plate having cylindrical inside and outside surfaces wherein the inside surface of the second extension overlaps a portion of the outside surface of the first extension and with a set of radially oriented turbine blades (107) mounted on and around the second extension adjacent to and in line with the tubular openings so that fluid flow is parallel to the axis of the shaft in the tubular openings across the turbine blades to rotate the rotor;

(d) a housing (108) mounted around the openings in the first plate such that the turbine blades are in closely spaced relationship with the housing;

(e) at least one rotor blade (50, 51) mounted in a slot (52) around the outside surface of the rotor so as to provide at least two sealed chambers with the inside of the first extension, the first and second plate and the outside surface of the rotor; and (f) connection means (110) for rotatably joining the second plate to the end of the shaft opposite the first plate;

wherein in operation of the turbine fluid flow through the tubular openings across the first blades and out of the housing rotates the second plate and the rotor and simultaneously the rotor blade and rotor means compress and drive the fluid between the inlet and outlet openings inside the rotor on either side of the line of minimum eccentricity.

4. The turbine of claim 3 wherein there is at least one rotor blade.

5. The turbine of claim 3 as a supercharger an an engine including tubular connection means such that exhaust gases from the engine are the driving fluid for turbine blades and then are exhausted and such that fluid compressed and driven by the rotor and rotor blade is a fuel air-mixture to be fed to a hydrocarbon powered engine.

6. The turbine of claim 3 wherein the second extension includes a second shaft as a driving means extending away from and along the axis of the shaft.

7. A turbine which comprises in combination:
   (a) a cylindrically cross-sectioned shaft (10) having a longitudinal axis along a length between two opposing ends (10a and 10b);
   (b) a first plate (11) mounted on and around the shaft at one end (10b) perpendicular to the axis with an integral first cylindrical tubular extension (13) around the shaft having a cylindrical inside surface (13a) which is eccentric to the axis and a cylindrical outside surface (13b) concentric with the axis and with a radial line of minimum eccentricity parallel to the axis and having multiple equidistant tubular openings (14) positioned radially of and concentric with the axis of the shaft and around the outside of the extension and with adjacent inlet and outlet openings (15, 16) through the inside and outside surface of the first extension on either side of the line of minimum eccentricity;
   (c) a rotor (30) having cylindrical inside surface (30a) rotatably mounted on the shaft to provide rotation around the axis of the shaft and having a cylindrical outside surface (30b) concentric with the axis and in closely spaced relation to the line of minimum eccentricity of the inside surfaces of the first tubular extension wherein the rotor supports an integral second plate (34) which is perpendicular to the axis and parallel to the first plate with an integral second cylindrical extension (32) having a cylindrical surface which overlaps a portion of a surface (13b) of the first extension and with a first set of radially oriented turbine blades (33) mounted on and around the second extension adjacent to and in line with the tubular openings wherein fluid for is parallel to the axis of the shaft in the tubular openings across the turbine blades to rotate the rotor;
   (d) a plate (34) mounted on the second extension (32) with an integral second set of radially oriented turbine blades (35) in spaced relation to the first set of turbine blades and in closely spaced relationship to the housing;
   (e) a housing (40) mounted around the openings in the first plate and first turbine blades which is concentric with and around the axis of the shaft such that the first turbine blades are in closely spaced relationship with the housing and supporting multiple radially oriented integral angled flow directing vanes (41) between and in closely spaced relation to the first and second turbine blades and in closely spaced relation to the outside surface of the second extension;
   (f) at least one rotor blade (50, 51) mounted in a slot (52) around the outside surface of the rotor so as to provide a sealed chamber with the inside of the first extension;
   (g) connection means (53) for rotatably joining the second plate to the shaft, and
   wherein in operation of the turbine a driving fluid flow is provided through the tubular openings across the first blades against the flow vane to the second blades and out of the housing to thereby rotate the second plate and the rotor together and wherein the rotor blade and rotor together compress and drive the fluid between the inlet and outlet openings inside the rotor on either side of the line of minimum eccentricity.

8. The turbine of claim 7 wherein a second shaft (57) is attached to the third plate along the axis of and away from the first shaft so as to provide a drive means for utilizing the rotation of the rotor.

* * * * *

UNITED STATES PATENT AND TRADEMARK OFFICE
CERTIFICATE OF CORRECTION

PATENT NO. : 4,504,196

DATED : March 12, 1985

INVENTOR(S) : Joachim E. Lay

It is certified that error appears in the above—identified patent and that said Letters Patent are hereby corrected as shown below:

Column 6, line 29 "motor" should be --rotor--.

Signed and Sealed this

Sixth Day of August 1985

[SEAL]

*Attest:*

DONALD J. QUIGG

*Attesting Officer*   *Acting Commissioner of Patents and Trademarks*